(12) United States Patent
Christensen

(10) Patent No.: US 6,848,651 B2
(45) Date of Patent: Feb. 1, 2005

(54) ELECTRO-HYDRAULIC THRUST REVERSER LOCK ACTUATION SYSTEM AND METHOD

(75) Inventor: Donald J. Christensen, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/671,373

(22) Filed: Sep. 24, 2003

(65) Prior Publication Data

US 2004/0195432 A1 Oct. 7, 2004

Related U.S. Application Data

(60) Provisional application No. 60/416,738, filed on Oct. 7, 2002.

(51) Int. Cl.$^7$ ................................................. B64C 7/00
(52) U.S. Cl. ................................... 244/110 B; 244/126
(58) Field of Search .............................. 244/110 B, 10, 244/12.4, 12.5, 23 D, 123, 126–130, 113; 239/265

(56) References Cited

U.S. PATENT DOCUMENTS

| | | | | |
|---|---|---|---|---|
| 2,411,895 A | * | 12/1946 | Poole | ........................... 60/242 |
| 3,109,284 A | * | 11/1963 | Ashwood | ............... 239/265.17 |
| 4,191,094 A | * | 3/1980 | Flippo | |
| 4,383,647 A | | 5/1983 | Woodruff et al. | ...... 239/265.19 |
| 4,399,966 A | * | 8/1983 | Crudden et al. | |
| 4,671,460 A | | 6/1987 | Kennedy et al. | |
| 5,609,020 A | * | 3/1997 | Jackson et al. | |
| 5,735,557 A | * | 4/1998 | Harvey | |
| 6,032,901 A | * | 3/2000 | Carimali et al. | |
| 6,045,091 A | | 4/2000 | Baudu et al. | |
| 6,227,485 B1 | * | 5/2001 | Porte | |
| 6,343,769 B1 | | 2/2002 | Davies | ................... 244/110 B |
| 2002/0144499 A1 | * | 10/2002 | Rouyer et al. | |
| 2003/0218094 A1 | | 11/2003 | Lair | ........................ 244/110 B |

* cited by examiner

Primary Examiner—Teri P. Luu
Assistant Examiner—Stephen A Holzen
(74) Attorney, Agent, or Firm—Douglas A. Mullen, Esq.

(57) ABSTRACT

An electro-hydraulic thrust reverser lock actuation system includes a hydraulic fluid source and a lock actuator assembly that is configured to selectively pressurize the hydraulic fluid. The lock actuator assembly is adapted to receive a lock control signal and, in response, pressurize the hydraulic fluid in the hydraulic fluid source. One or more lock assemblies are in fluid communication with the hydraulic fluid source and are configured, in response to the hydraulic fluid pressurization, to move to one of a locked or an unlocked position.

23 Claims, 4 Drawing Sheets

ELECTRO-HYDRAULIC THRUST REVERSER LOCK ACTUATION SYSTEM AND METHOD

CROSS-REFERENCE TO RELATED APPLICATION

This application claims the benefit of U.S. Provisional Application No. 60/416,738, filed Oct. 7, 2002.

FIELD OF THE INVENTION

The present invention relates to aircraft engine thrust reverser actuation systems and, more particularly, to a thrust reverser lock actuation system that is implemented using electro-hydraulic components.

BACKGROUND OF THE INVENTION

When a jet-powered aircraft lands, the landing gear brakes and aerodynamic drag (e.g., flaps, spoilers, etc.) of the aircraft may not, in certain situations, be sufficient to slow the aircraft down in the required amount of runway distance. Thus, jet engines on most aircraft include thrust reversers to enhance the braking of the aircraft. When deployed, a thrust reverser redirects the rearward thrust of the jet engine to a generally or partially forward direction to decelerate the aircraft. Because at least some of the jet thrust is directed forward, the jet thrust also slows down the aircraft upon landing.

Various thrust reverser designs are commonly known, and the particular design utilized depends, at least in part, on the engine manufacturer, the engine configuration, and the propulsion technology being used. Thrust reverser designs used most prominently with jet engines fall into three general categories: (1) cascade-type thrust reversers; (2) target-type thrust reversers; and (3) pivot door thrust reversers. Each of these designs employs a different type of moveable thrust reverser component to change the direction of the jet thrust.

Cascade-type thrust reversers are can be used on high-bypass ratio jet engines. This type of thrust reverser is located on the circumference of the engine's midsection and, when deployed, exposes and redirects air flow through a plurality of cascade vanes. The moveable thrust reverser components in the cascade design includes several translating sleeves or cowls ("transcowls") that are deployed to expose the cascade vanes.

Target-type reversers, also referred to as clamshell reversers, are typically used with low-bypass ratio jet engines. Target-type thrust reversers use two doors as the moveable thrust reverser components to block the entire jet thrust coming from the rear of the engine. These doors are mounted on the aft portion of the engine and may form the rear part of the engine nacelle.

Pivot door thrust reversers may utilize four doors on the engine nacelle as the moveable thrust reverser components. In the deployed position, these doors extend outwardly from the nacelle to redirect the jet thrust.

The primary use of thrust reversers is, as noted above, to enhance the braking of the aircraft, thereby shortening the stopping distance during landing. Hence, thrust reversers are usually deployed during the landing process to slow the aircraft. Thereafter, when the thrust reversers are no longer needed, they are returned to their original, or stowed, position. Once in the stowed position, the one or more locks are engaged to prevent unintended movement of the thrust reversers and/or actuators that move the thrust reversers.

In the past, many of the above described thrust reverser systems were hydraulic-type systems, and included various hydraulically operated actuation and control devices. Although safe and reliable, many hydraulic systems and components have exhibited small amounts of leakage, resulting in the need for periodic clean up. Hence, in an effort to do away with at least some of the hydraulic systems and components on aircraft, thrust reverser actuation systems are being designed and implemented using electrically operated and controlled components. These electrically operated components include various motors and solenoids, which are used to control the various thrust reverser system actuators and locks.

Although electrical thrust reverser actuation systems are safe, reliable, and robustly designed, these systems also exhibit certain drawbacks. For example, some of the locks may need relatively large solenoids or dedicated electric motors to ensure proper operation. These large solenoids and dedicated motors can increase overall system size envelope, and overall system weight, both of which can lead to increased implementation costs.

Hence, there is a need for a system and method of controlling thrust reverser actuation system locks in an electrical thrust reverser actuation system that does not rely on relatively large solenoids and/or dedicated motors and/or does not increase overall system size and/or does not increase overall system weight and/or does not increase system implementation costs. The present invention addresses one or more of these needs.

SUMMARY OF THE INVENTION

The present invention provides an electro-hydraulic thrust reverser lock actuation system and method. The lock actuation system does not use large solenoids or motors, and is relatively small and lightweight as compared to many fully electric counterpart systems.

In one embodiment, and by way of example only, a system for moving an aircraft thrust reverser includes a power drive unit, a thrust reverser actuator assembly, a main reservoir, a lock actuator assembly, and one or more lock assemblies. The power drive unit is operable to supply a drive force. The thrust reverser actuator assembly is coupled to receive the drive force and is operable, in response thereto, to selectively move the thrust reverser between a stowed position and a deployed position. The main reservoir contains a hydraulic fluid therein. The lock actuator assembly is coupled to the main reservoir and is adapted to receive a lock control signal. The lock actuator is responsive to the lock control signal to compress, and thereby pressurize, the hydraulic fluid. Each lock assembly is in fluid communication with the main reservoir and is configured, in response to the hydraulic fluid pressurization, to move to one of a locked or an unlocked position, to thereby prevent or allow, respectively, thrust reverser movement.

In another exemplary embodiment, an electro-hydraulic thrust reverser lock actuation system includes a main reservoir, a lock actuator assembly, and one or more lock assemblies. The main reservoir contains a hydraulic fluid therein. The lock actuator assembly is coupled to the main reservoir and is adapted to receive a lock control signal. The lock actuator is responsive to the lock control signal to compress, and thereby pressurize, the hydraulic fluid. Each lock assembly is in fluid communication with the main reservoir and is configured, in response to the hydraulic fluid pressurization, to move to one of a locked or an unlocked position.

In still another exemplary embodiment, in an aircraft thrust reverser system including a main reservoir containing hydraulic fluid therein, an actuator assembly coupled to the reservoir, and one or more locks, a method of controlling the locks includes energizing the actuator assembly to thereby translate at least a portion thereof in a first direction. The hydraulic fluid in the main reservoir is pressurized in response to the translation of the actuator assembly in the first direction. The locks are moved to one of a locked or an unlocked position in response to the hydraulic fluid pressurization.

Other independent features and advantages of the preferred thrust reverser lock actuation system and method will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the described embodiment is not limited to use in conjunction with a specific thrust reverser system design. Thus, although the description is explicitly directed toward an embodiment that is implemented in a cascade-type thrust reverser system, in which transcowls are used as the moveable thrust reverser component, it should be appreciated that it can be implemented in other thrust reverser actuation system designs, including those described above and those known now or hereafter in the art.

Figure 1:
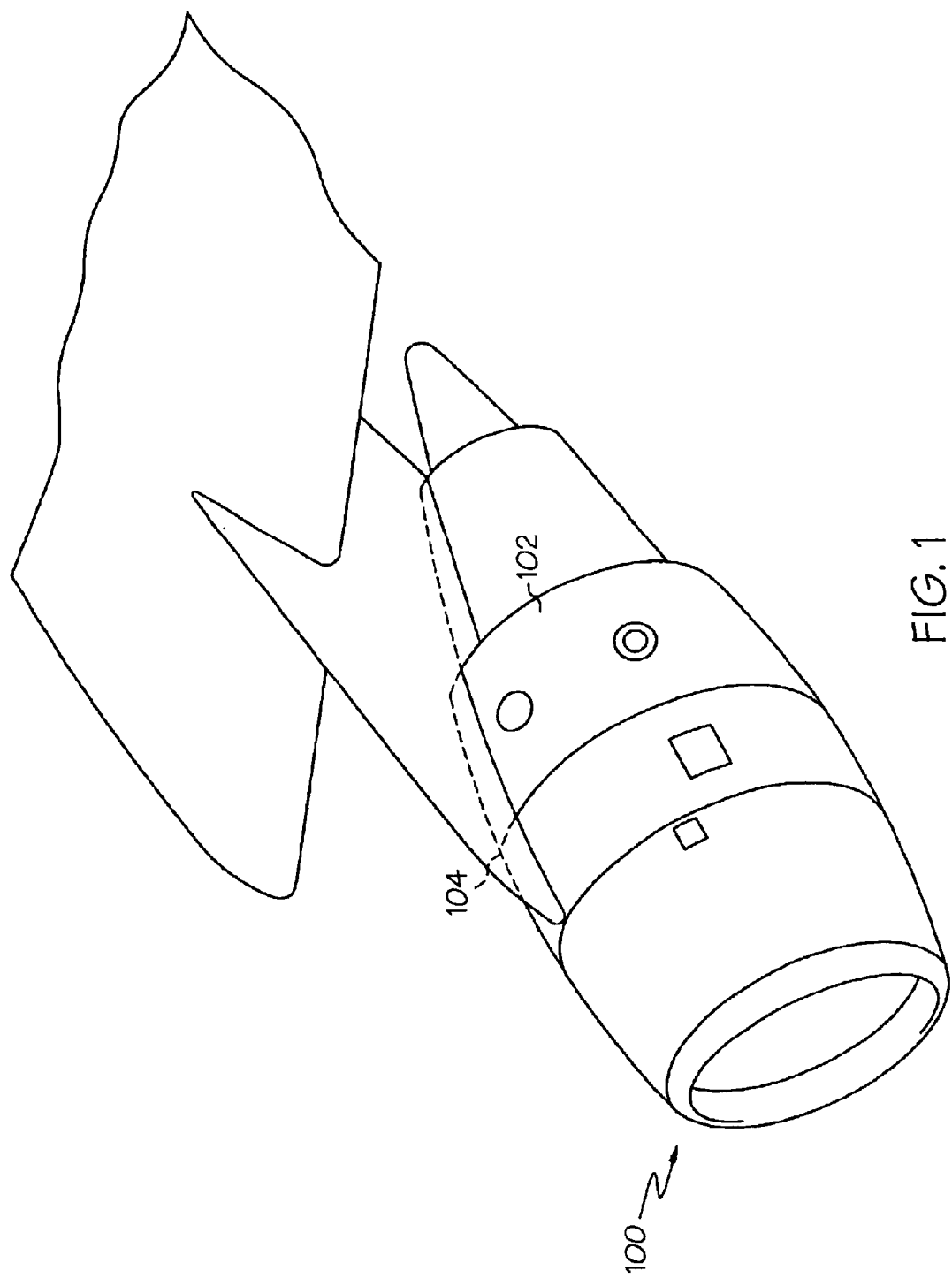
FIG. 1 is a perspective view of portions of an aircraft jet engine fan case.

Turning now to the description, and with reference first to FIG. 1, a perspective view of portions of an aircraft jet engine fan case 100 that incorporates a cascade-type thrust reverser is depicted. The engine fan case 100 includes a pair of semi-circular transcowls 102 and 104 that are positioned circumferentially on the outside of the fan case 100. The transcowls 102 and 104 cover a plurality of non-illustrated cascade vanes. A mechanical link 202 (see FIG. 2), such as a pin or latch, may couple the transcowls 102 and 104 together to maintain the transcowls 102 and 104 in correct alignment on non-illustrated guides on which the transcowls 102 and 104 translate. When the thrust reversers are commanded to deploy, the transcowls 102 and 104 are translated aft. This, among other things, exposes the cascade vanes, and causes at least a portion of the air flowing through the engine fan case 100 to be redirected, at least partially, in a forward direction. This re-direction of air flow in a forward direction creates a reverse thrust, and thus works to slow the airplane.

Figure 2:
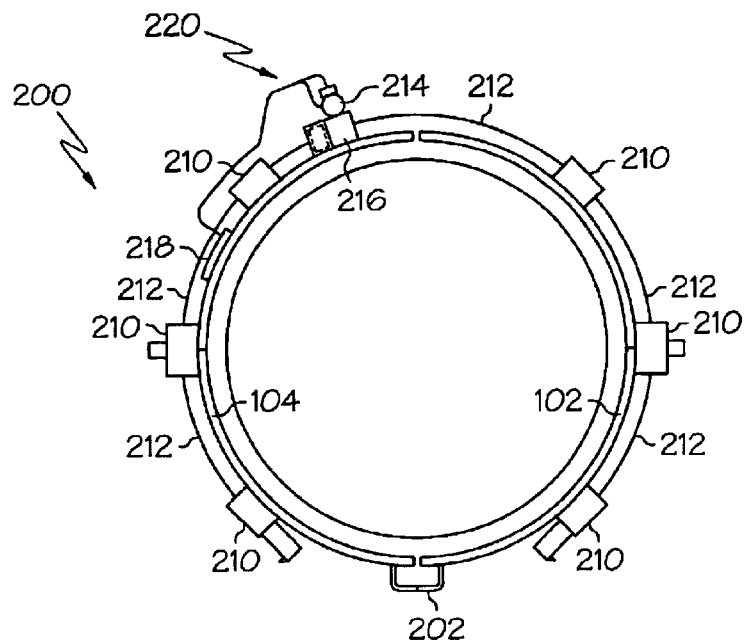
FIG. 2 is a simplified end view of a thrust reverser actuation system according to an exemplary embodiment of the present invention.
Figure 3:
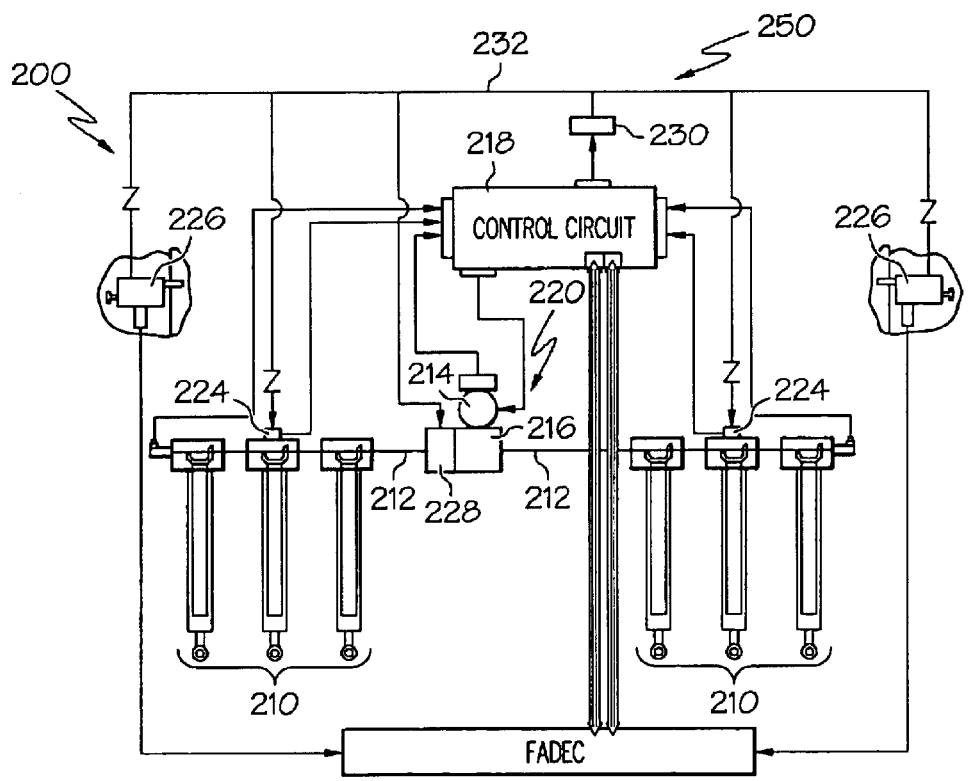
FIG. 3 is a schematic representation of the thrust reverser actuation system shown in FIG. 2, and further depicting an electro-hydraulic thrust reverser lock actuation system, according to an exemplary embodiment of the present invention.

The transcowls 102 and 104 are moved between the deploy and stow positions via a thrust reverser control system. An exemplary embodiment of a thrust reverser control system 200 is depicted in FIGS. 2 and 3, and includes a plurality of actuators 210, which are individually coupled to the transcowls 102 and 104 (not shown in FIG. 3). In the depicted embodiment, half of the actuators 210 are coupled to one of the transcowls 102, and the other half are coupled to another transcowl 104. It is noted that the actuators 210 may be any one of numerous actuator designs presently known in the art or hereafter designed. However, in this embodiment the actuators 210 are ballscrew actuators. It is additionally noted that the number and arrangement of actuators 210 is not limited to what is depicted in FIG. 2, but could include other numbers of actuators 210 as well. The number and arrangement of actuators is selected to meet the specific design requirements of the system.

The actuators 210 are interconnected via a plurality of drive mechanisms 212, each of which, in the particular depicted embodiment, is a flexible shaft. Using flexible shafts 212 in this configuration ensures that the actuators 210 and the transcowls 102 and 104, when unlocked, move in a substantially synchronized manner. For example, when one transcowl 102 is moved, the other transcowl 104 is moved a like distance at substantially the same time. Other synchronization mechanisms that may be used include electrical synchronization or open loop synchronization, or any other mechanism or design that transfers power between the actuators 210.

A power drive unit (PDU) assembly 220 is coupled to the actuators 210 via one or more of the flexible shafts 212. In the depicted embodiment, the PDU assembly 220 includes a motor 214 that is coupled to one or more of the flexible shafts via a torque decoupler 216. The motor 222 may be any one of numerous types of motors such as, for example, an electric (including any one of the various DC or AC motor designs known in the art), a hydraulic, or a pneumatic motor. The torque decoupler 224 is coupled between an output of the motor 222 and two of the flexible shafts 212. In the depicted arrangement, the rotation of the PDU assembly 220 results in the synchronous operation of the actuators 210, via the flexible shafts 212, thereby causing the transcowls 102 and 104 to move at substantially the same rate.

A control circuit 218 controls the PDU assembly 220, and receives various signals from one or more positions sensors. The control circuit 218 receives commands from an engine control system 222 such as, for example, a FADEC (full authority digital engine control) system, and provides appropriate activation signals to the PDU assembly 220 in response to the received commands. In turn, the PDU assembly 220 supplies a drive force to the actuators 210 via the flexible shafts 212. As a result, the actuators 210 cause the transcowls 102 and 104 to translate between the stowed and deployed positions.

The thrust reverser control system 200 additionally includes a lock system 250 that functions to prevent unintended movement of the transcowls 102 and 104 from the stowed position. In the depicted embodiment, the lock system 250 includes two primary lock assemblies 224, two tertiary lock assemblies 226, a PDU lock assembly 228 (or "brake"), and a lock actuator assembly 230, all interconnected via a plurality of hydraulic lines 232. In a particular preferred embodiment, the lock system 250 is configured as a self-contained, hermetically sealed, and substantially air-free and leak-free hydraulic system. It will be appreciated, however, that the lock system could be configured as an open system and/or interconnected to another hydraulic system on the aircraft. It will additionally be appreciated that the number of lock assemblies described herein is merely exemplary of one particular embodiment, and that other numbers and configurations of lock assemblies could be used to meet specific design requirements. Moreover, the thrust reverser control system 200 could include two lock actuator assemblies 230, one for the locks 224, 226, 228 associated with each thrust reverser transcowl 102, 104.

The primary lock assemblies 224 are each mounted on one of the actuators 210 and are configured to selectively prevent movement of one of the actuators 210, and thereby prevent transcowl movement. The tertiary lock assemblies 226 are each mounted on the engine nacelle (not illustrated) and are configured to selectively engage a portion of the transcowls 102, 104 directly, to thereby prevent transcowl movement. The PDU lock assembly 228 is configured to selectively prevent or allow rotation of the motor 214, and thereby prevents transcowl movement. It will be appreciated that the lock assemblies 224, 226, 228 are each hydraulically-operated, and may be configured as any one of numerous know hydraulic lock assemblies. Such lock assemblies, as is generally known, may include, for example, bellows-type operators or piston-type operators that control movement of the locks between the locked and unlocked positions. It will additionally be appreciated that each of the lock assemblies 224, 226, 228 is configured to default to a normally locked position by, for example a biasing spring. Thus, when not commanded to move to the locked position, each lock assembly will move to the locked position. The specific configuration of each of the individual lock assemblies is not necessary to understand or enable the present invention, and will therefore not be provided.

As FIG. 3 also shows, a flow control check valve 302 is disposed in each of the hydraulic fluid lines 232 upstream of each primary 224 and tertiary 226 lock assembly includes. These flow control check valves 302 are configured to allow substantially unrestricted flow from the lock actuator assembly 230 to the primary 224 and tertiary 226 lock assemblies, while restricting the flow in the opposite direction. By restricting the flow in the opposite direction, the rate at which the primary 224 and tertiary 226 lock assemblies move from the unlocked to the locked positions can be controlled. It is noted that in the depicted embodiment the PDU lock assembly 228 does not include a flow control check valve 3xx. This is because it is desirable for this lock assembly 228 to have a relatively fast response, since one of its functions is to quickly move to its locked position in the unlikely event that electric power or motor control is lost during operation The lock actuator assembly 230, as was alluded to above, is fluidly coupled to, and controls the operation of, each of the lock assemblies 224, 226, 228. The lock actuator assembly 230 is also electrically coupled to the control circuit 218, which controls operation of the lock actuator assembly 230. In particular, when the control circuit 228 receives the command signals to supply the appropriate activation signals to the PDU assembly 226, the control circuit 228 also supplies an appropriate lock control signal to the lock actuator assembly 230. As will be described more fully below, the lock actuator assembly 230, upon receipt of the appropriate lock control signal, selectively increases or decreases the pressure of the hydraulic fluid supplied to the lock assemblies 224, 226, 228, causing each to move to the unlocked or locked position, respectively. A description of a particular embodiment of the lock actuator assembly 230, and how it functions to control the operation of each lock assembly will now be provided.

Figure 4:
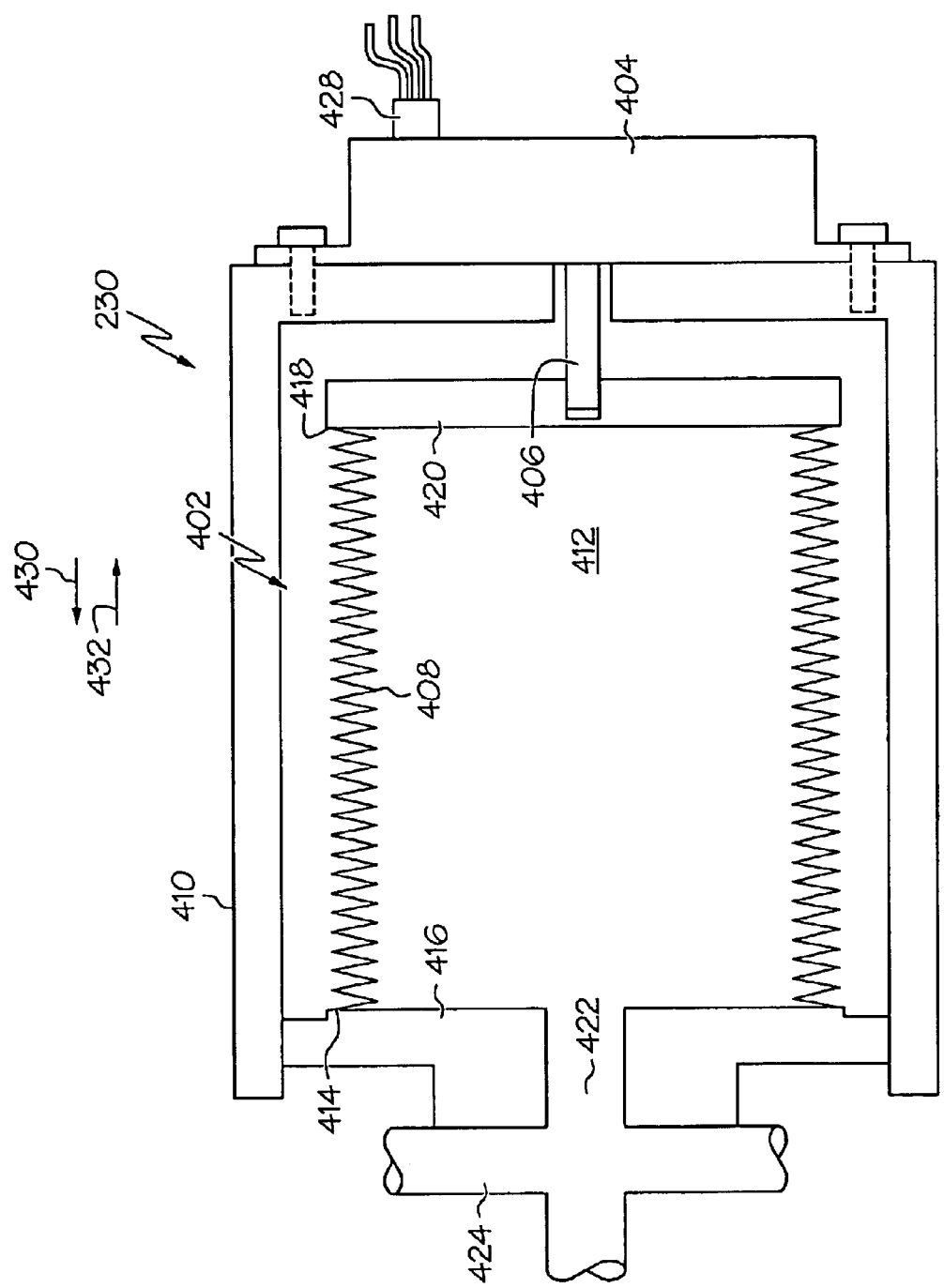
FIG. 4 is a partial cross section view of an electro-hydraulic thrust reverser lock actuator assembly according to an exemplary embodiment of the present invention that may be used in the system shown in FIGS. 1 and 2.

The lock actuator assembly 230, an embodiment of which is shown in FIG. 4, includes a reservoir 402, a motor 404, and an actuator 406. The reservoir 402, in the depicted embodiment, is a flexible bellows 408 that is made of any one of numerous materials including, but not limited to, various steel alloys. The bellows 408 is contained within a housing 410, and is at least partially filled with a hydraulic fluid medium 412. The hydraulic fluid 412 may be any one of numerous types of hydraulic fluid media such as, for example, conventional generic brake fluid, and conventional generic transmission fluid. Preferably, however, hydraulic fluid such as MIL-H-5606 or MIL-PRF-83282 is used.

The bellows 408 is coupled at a first end 414 to an end cap 416 and at a second end 418 to an end plate 420. The bellows first 414 and second ends 418 are preferably coupled to the end cap 416 and the end plate 420, respectively, by, for example, a welding process, though it will be appreciated that any one of numerous other known methods of coupling could be used. The end plate 420 includes an opening 422 that fluidly communicates the hydraulic fluid 412 in the bellows 408 with a fluid manifold 424 that is coupled to the housing 410. The fluid manifold 424 fluidly communicates the bellows 412 with the plurality of hydraulic lines 232 (not shown in FIG. 4), and thus with each of the hydraulic lock assemblies 224, 226, 228.

The motor 404 is coupled to an end of the housing 410, and includes an input connection 428 such as, for example, a plug connector that is adapted to receive appropriate control signals from the control circuit 218. The motor 404 may be any one of numerous known motor designs known now, or developed in the future, but in a preferred embodiment, it is a DC or AC electric motor. The motor 404 is also coupled to the actuator 406. As will be described in more detail below, the motor 404 is configured to rotate in response to the lock control signal it receives from the control circuit 218, and to supply a drive force to the actuator 406. The motor 404 is also configured such that when it is not receiving a lock control signal it is free to rotate. The purpose for this will be discussed further below.

The actuator 406 is coupled between the motor 404 and the bellows end plate 420, and is configured to translate in response to an appropriate drive force. This drive force may be supplied from either the motor 402 or, as will be described more fully below, hydraulic fluid pressure. To do so, the actuator 406 is configured to translate linearly in either a first 430 or a second 432 direction, in response to the appropriately applied drive force. It will be appreciated that the actuator 406 may be any one of numerous known elements that may implement this functionality such as, for example, a leadscrew, or a ballscrew.

Having described the lock actuator assembly 230 and its interconnection to each of the lock assemblies 224, 226, 228, as well as an exemplary embodiment of each lock assembly 224, 226, 228, in detail from a structural standpoint, a detailed description of the method whereby it controls the operation of each of the locks 224, 226, 228 will now be described. In doing so, reference should be made, as necessary, to FIGS. 2–4 in combination. Moreover, it is to be understood that the following discussion is predicated on each of the lock assemblies 224, 226, 228 initially being in the normal, locked positions.

Turning now to a description of the method, when the locks 224, 226, 228 are to be moved to the unlocked position, the control circuit 218, in response to an appropriate command signal from the FADEC, will supply an appropriate lock control signal to the motor 404. The motor 404, upon receipt of the lock control signal, will rotate a number of revolutions in an unlock direction. As the motor 404 rotates, the actuator assembly 406 will in turn translate in the first direction 430, which will compress the bellows 408. As the bellows 408 is compressed, the pressure of the hydraulic fluid 412 in the hydraulic lines 232 increases until it overcomes the spring force within each of the lock assemblies 224, 226, 228. This pressure increase in turn causes each of the lock assemblies 224, 226, 228 to move from the locked to the unlocked position. It will be appreciated that the control circuit 218 will command the motor 404 and actuator 406 to compress the bellows 408 a predetermined amount to preferably attain, and substantially maintain, a predetermined pressurization magnitude, and will continue to do so until it is desired to move the lock assemblies 224, 226, 228 to the locked position.

When the lock assemblies 224, 226, 228 are to be returned to the locked position, the control circuit 218, in response to the appropriate command signal from, for example, the FADEC, will remove power from the motor 404. With power removed from the motor 404, the motor 404, as was noted above, is free to rotate and, as a result, the actuator 406 is free to translate. Thus, the pressurized hydraulic fluid 412, acting on the end plate 420, in combination with the biasing springs in each of the lock assemblies 224, 226, 228, will cause the actuator 406 to translate in the second direction 432. This will in turn depressurize the hydraulic fluid 412, and allow each of the lock assemblies 224, 226, 228 to return to the locked positions.

It will be appreciated that in an alternate embodiment, the control circuit 218 could be configured to also supply an appropriate lock control signal to the actuator assembly motor 404 when it is desired to move the lock assemblies 224, 226, 228 from the unlocked positions to the locked positions. In such an alternative embodiment, the lock control signal would energize the motor 404 and cause it to rotate in the opposite direction, which would in turn cause the actuator 406 to translate in the second direction 432, depressurize the hydraulic fluid 412, and allow the lock assemblies 224, 226, 228 to move to the unlocked positions.

Figure 5:
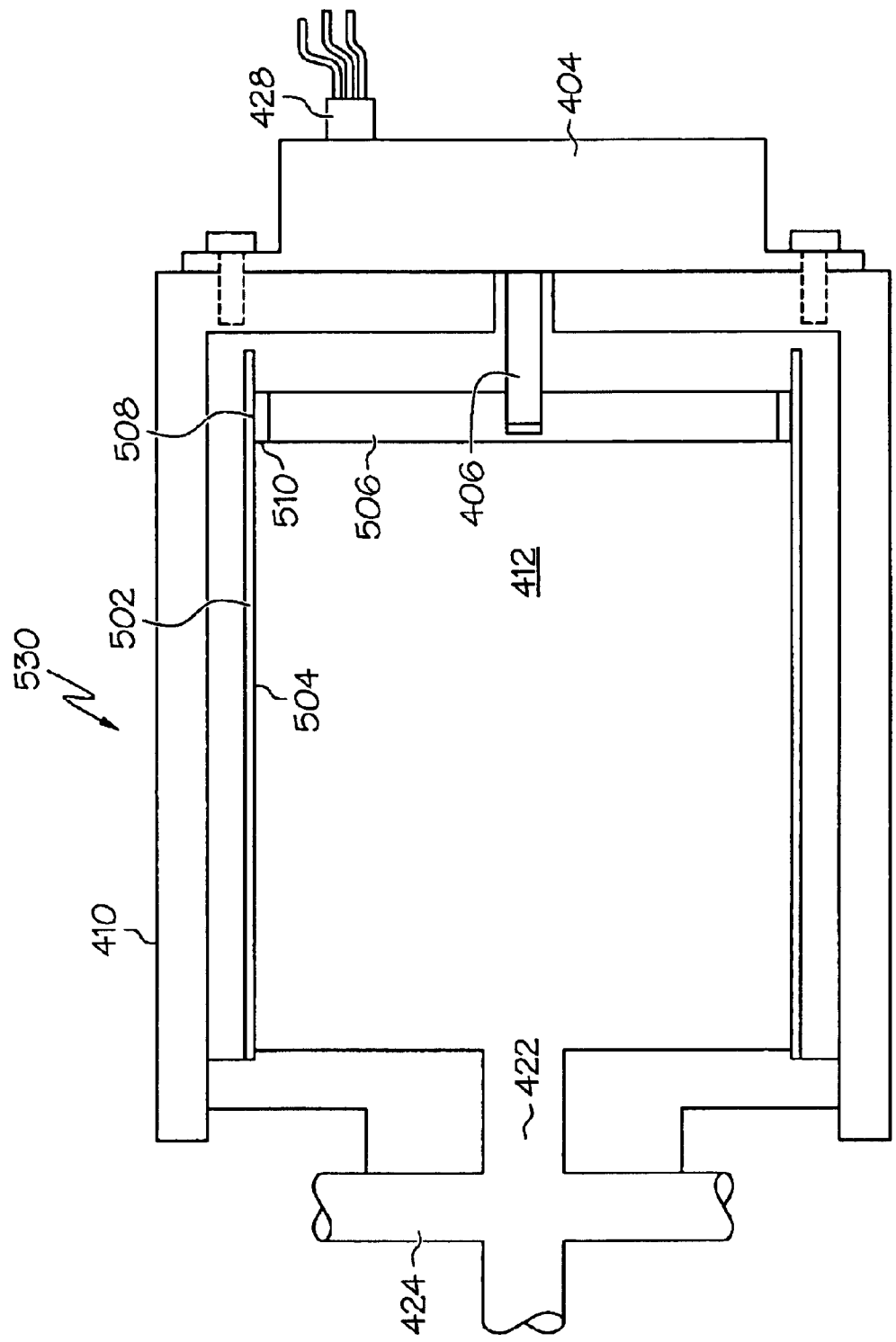
FIG. 5 is a partial cross section view of an electro-hydraulic thrust reverser lock actuator assembly according to an exemplary alternative embodiment of the present invention that may be used in the system shown in FIGS. 1 and 2.

It will additionally be appreciated that the lock actuator assembly 230 may be implemented with a different type of reservoir. In particular, as shown in FIG. 5, rather than using a flexible bellows 408 as the reservoir, the alternative actuator assembly 530 uses a substantially solid reservoir 502. The reservoir 502 may be formed in any one of numerous shapes, but in a preferred embodiment it has an inner peripheral surface 504 that is substantially cylindrical in cross section. Moreover, in this alternative embodiment the actuator 406 is coupled to a plunger 506, which is moveable within the reservoir 502. The plunger 506 has an outer peripheral surface 508 that preferably is shaped substantially similar to the cross section of the reservoir inner peripheral surface 504. The plunger outer peripheral surface 508 contacts, in a substantially fluid-tight fashion, the reservoir inner peripheral surface 504. To facilitate this substantially fluid-tight contact, one or more fluid seals 510 may be coupled to, or formed integrally on, the plunger outer peripheral surface 508.

The electro-hydraulic thrust reverser lock actuation system described herein does not use large solenoids or motors, and is relatively small and lightweight as compared to many fully electric counterpart systems. Although the electric motor to drive this system may be relatively large in comparison to individual motors that could be implemented on each lock assembly, it is smaller, in both weight and size, than the combined weight and size of each of the smaller individual motors. The lock actuation system also allows the motor to be mounted away from the actuators, which may be vibration sensitive. As a result, the system can be implemented at a potentially lower cost than a fully electric actuation system, while increasing system reliability, and reducing system maintenance.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A system for moving an aircraft thrust reverser, comprising:
    a power drive unit operable to supply a drive force;
    a thrust reverser actuator assembly coupled to receive the drive force and operable, in response thereto, to selectively move the thrust reverser between a stowed position and a deployed position;
    a main reservoir containing a hydraulic fluid therein;
    a lock actuator assembly coupled to the main reservoir and adapted to receive a lock control signal, the lock actuator assembly responsive to the lock control signal to compress, and thereby pressurize, the hydraulic fluid; and
    one or more lock assemblies, each lock assembly in fluid communication with the main reservoir and configured, in response to the hydraulic fluid pressurization, to move to one of a locked or an unlocked position, to thereby prevent or allow, respectively, thrust reverser movement.

2. The system of claim 1, wherein the lock actuator assembly comprises:
    an electric motor adapted to receive the lock control signal and operable, in response thereto, to rotate in at least a first direction; and
    an actuator coupled to the motor and the main reservoir, the actuator configured to translate in at least a first direction in response to the motor rotation in the first direction, to thereby compress the hydraulic fluid.

3. The system of claim 2, wherein the lock actuator assembly motor is free to rotate in at least a second direction when the lock control signal is not received.

4. The system of claim 1, wherein:
    the main reservoir comprises a flexible membrane; and
    the lock actuator assembly is responsive to the lock control signal to compress the flexible membrane to thereby compress the hydraulic fluid.

5. The system of claim 4, wherein the lock actuator assembly comprises:
    an electric motor adapted to receive the lock control signal and operable, in response thereto, to rotate in at least a first direction;
    an actuator coupled to the motor and the reservoir, the actuator configured to translate in at least a first direction in response to the motor rotation in the first direction, whereby translation of the actuator in the first direction results in the compression of the hydraulic fluid.

6. The system of claim 1, wherein the main reservoir comprises a substantially hollow cylinder having an inner peripheral surface, and wherein the lock actuator assembly comprises:

an electric motor adapted to receive the lock control signal and operable, in response thereto, to selectively rotate in at least a first direction;

an actuator coupled to the motor, the actuator configured to translate linearly in at least a first direction in response to the motor rotation in the first direction; and a plunger coupled to the actuator and having an outer peripheral surface in substantially fluid sealed contact with the main reservoir inner peripheral surface, whereby translation of the actuator in the first direction results in the compression of the hydraulic fluid.

7. The system of claim 1, wherein at least one of the lock assemblies is mounted on the thrust reverser actuator assembly and is configured to selectively prevent or allow movement thereof.

8. The system of claim 1, wherein at least one of the lock assemblies is selectively coupled to the thrust reverser to thereby selectively prevent or allow movement thereof.

9. The system of claim 1, wherein at least one of the lock assemblies is coupled to the power drive unit and is configured, in response to the hydraulic fluid pressurization, to move to one of a set or a release position, to thereby prevent or allow, respectively, thrust reverser actuator assembly movement.

10. The system of claim 1, wherein one or more of the lock assemblies are biased toward the locked position.

11. The system of claim 1, wherein:

the main reservoir comprises a flexible membrane; and the lock actuator assembly is responsive to the lock control signal to compress the flexible membrane to thereby compress the hydraulic fluid.

12. The system of claim 11, wherein the lock actuator assembly comprises:

an electric motor adapted to receive the lock control signal and operable, in response thereto, to rotate in at least a first direction;

an actuator coupled to the motor and the reservoir, the actuator configured to translate in at least a first direction in response to the motor rotation in the first direction, whereby translation of the actuator in the first direction results in the compression of the hydraulic fluid.

13. An electro-hydraulic thrust reverser lock actuation system, comprising:

a main reservoir containing a hydraulic fluid therein;

a lock actuator assembly coupled to the main reservoir and adapted to receive a lock control signal, the lock actuator assembly responsive to the lock control signal to compress, and thereby pressurize, the hydraulic fluid; and one or more lock assemblies, each lock assembly in fluid communication with the main reservoir and configured, in response to the hydraulic fluid pressurization, to move to one of a locked or an unlocked position.

14. The system of claim 13, wherein the lock actuator assembly comprises:

an electric motor adapted to receive the lock control signal and operable, in response thereto, to rotate in at least a first direction; and an actuator coupled to the motor and the main reservoir, the actuator configured to translate in at least a first direction in response to the motor rotation in the first direction, to thereby compress the hydraulic fluid.

15. The system of claim 14, wherein the lock actuator assembly motor is free to rotate in at least a second direction when the lock control signal is not received.

16. The system of claim 13, wherein the main reservoir comprises a substantially hollow cylinder having an inner peripheral surface, and wherein the lock actuator assembly comprises:

an electric motor adapted to receive the lock control signal and operable, in response thereto, to selectively rotate in at least a first direction;

an actuator coupled to the motor, the actuator configured to translate linearly in at least a first direction in response to the motor rotation in the first direction; and a plunger coupled to the actuator and having an outer peripheral surface in substantially fluid sealed contact with the main reservoir inner peripheral surface, whereby translation of the actuator in the first direction results in the compression of the hydraulic fluid.

17. The system of claim 13, wherein at least one of the lock assemblies is mounted on the thrust reverser actuator assembly and is configured to selectively prevent or allow movement thereof.

18. The system of claim 13, wherein at least one of the lock assemblies is selectively coupled to the thrust reverser to thereby selectively prevent or allow movement thereof.

19. The system of claim 13, wherein at least one of the lock assemblies is coupled to the power drive unit and is configured, in response to the hydraulic fluid pressurization, to move to one of a set or a release position, to thereby prevent or allow, respectively, thrust reverser actuator assembly movement.

20. The system of claim 13, wherein one or more of the lock assemblies are biased toward the locked position.

21. In an aircraft thrust reverser system including a reservoir containing hydraulic fluid therein, an actuator assembly coupled to the reservoir, and one or more hydraulic locks in fluid communication with the reservoir, a method of controlling the locks, comprising:

energizing the actuator assembly to thereby translate at least a portion thereof in a first direction;

pressurizing a hydraulic fluid in response to the translation of the actuator assembly in the first direction; and moving the locks to one of a locked or an unlocked position in response to the hydraulic fluid pressurization.

22. The method of claim 21, further comprising:

deenergizing the actuator assembly to thereby allow the pressurized hydraulic fluid to translate at least a portion thereof in a second direction that is opposite the first direction, whereby the hydraulic fluid is depressurized; and moving the locks to one of an unlocked or locked position in response to the hydraulic fluid pressurization.

23. The method of claim 21, further comprising:

energizing the actuator assembly to translate at least a portion thereof in a second direction that is opposite the first direction to thereby depressurize the hydraulic fluid; and moving the locks to one of an unlocked or locked position in response to the hydraulic fluid pressurization.

* * * * *

UNITED STATES PATENT AND TRADEMARK OFFICE
CERTIFICATE OF CORRECTION

PATENT NO. : 6,848,651 B2  Page 1 of 1
DATED : February 1, 2005
INVENTOR(S) : Donald J. Christensen It is certified that error appears in the above-identified patent and that said Letters Patent is hereby corrected as shown below:

Column 9,
Line 32, delete "11" and add -- 14 --.
Line 32, delete "1" and add -- 11 --.
Line 37, delete "12" and add -- 15 --.
Line 37, delete "11" and add -- 14 --.
Line 48, delete "13" and add -- 11 --.
Line 61, delete "14" and add -- 12 --.
Line 61, delete "13" and add -- 11 --.

Column 10,
Line 3, delete "15" and add -- 13 --.
Line 3, delete "14" and add -- 12 --.

Signed and Sealed this

Thirteenth Day of June, 2006

JON W. DUDAS
*Director of the United States Patent and Trademark Office*